(12) United States Patent
Krishnan et al.

(10) Patent No.: US 11,900,159 B2
(45) Date of Patent: Feb. 13, 2024

(54) METHOD FOR REPOINTING RESOURCES BETWEEN HOSTS

(71) Applicant: VMware LLC, Palo Alto, CA (US)

(72) Inventors: Manoj Krishnan, Santa Clara, CA (US); Maarten Wiggers, San Francisco, CA (US)

(73) Assignee: VMware LLC, Palo Alto, CA (US)

( * ) Notice: Subject to any disclaimer, the term of this patent is extended or adjusted under 35 U.S.C. 154(b) by 231 days.

(21) Appl. No.: 17/498,592

(22) Filed: Oct. 11, 2021

(65) Prior Publication Data
US 2022/0027209 A1 Jan. 27, 2022

Related U.S. Application Data

(63) Continuation of application No. 16/443,943, filed on Jun. 18, 2019, now Pat. No. 11,144,354.

(30) Foreign Application Priority Data

Jul. 31, 2018 (IN) .............................. 201841028748

(51) Int. Cl.
*G06F 9/50* (2006.01)

(52) U.S. Cl.
CPC ...... *G06F 9/5011* (2013.01); *G06F 2209/503* (2013.01)

(58) Field of Classification Search
None
See application file for complete search history.

(56) References Cited

U.S. PATENT DOCUMENTS

| | | | | |
|---|---|---|---|---|
| 6,151,688 A | * | 11/2000 | Wipfel | G06F 11/008 709/224 |
| 6,996,741 B1 | * | 2/2006 | Pittelkow | G06F 11/2092 714/4.2 |
| 7,219,122 B1 | * | 5/2007 | Pena-Mora | G06F 11/2035 709/201 |
| 7,409,586 B1 | * | 8/2008 | Bezbaruah | G06F 11/0793 714/13 |
| 9,003,086 B1 | * | 4/2015 | Schuller | G06F 3/0665 710/62 |
| 9,350,681 B1 | * | 5/2016 | Kitagawa | H04L 41/12 |
| 9,928,099 B1 | | 3/2018 | Surani et al. | |
| 10,177,965 B1 | * | 1/2019 | Joshi | H04L 67/141 |
| 10,452,444 B1 | * | 10/2019 | Jibaja | G06F 3/0665 |

(Continued)

OTHER PUBLICATIONS

Non-Final Office Action received for U.S. Appl. No. 16/443,943, mailed on Jan. 26, 2021, 16 pages.

(Continued)

*Primary Examiner* — Adam Lee
(74) *Attorney, Agent, or Firm* — Quarles & Brady LLP

(57) ABSTRACT

Techniques are disclosed for reallocating host resources in a virtualized computing environment when certain criteria have been met. In some embodiments, a system identifies a host disabling event. In view of the disabling event, the system identifies a resource for reallocation from a first host to a second host. Based on the identification, the computer system disassociates the identified resource's virtual identifier from the first host device and associates the virtual identifier with the second host device. Thus, the techniques disclosed significantly reduce a system's planned and unplanned downtime.

17 Claims, 6 Drawing Sheets

(56) References Cited

U.S. PATENT DOCUMENTS

| | | | |
|---|---|---|---|
| 10,585,757 B1* | 3/2020 | Jagannatha | G06F 16/188 |
| 2002/0188655 A1* | 12/2002 | Brown | G06F 3/065 |
| | | | 709/201 |
| 2004/0059805 A1* | 3/2004 | Dinker | G06F 11/2069 |
| | | | 709/201 |
| 2005/0021573 A1* | 1/2005 | McDermott | G06F 11/2033 |
| 2005/0022047 A1* | 1/2005 | Chandrasekaran | |
| | | | G06F 16/2343 |
| | | | 707/E17.007 |
| 2005/0251802 A1 | 11/2005 | Bozek et al. | |
| 2006/0045089 A1 | 3/2006 | Bacher et al. | |
| 2006/0064697 A1* | 3/2006 | Kagi | G06F 9/5011 |
| | | | 718/103 |
| 2007/0022122 A1* | 1/2007 | Bahar | H04L 67/1097 |
| 2007/0050544 A1* | 3/2007 | Chawla | G06F 11/1092 |
| | | | 711/114 |
| 2007/0208836 A1 | 9/2007 | Madnani et al. | |
| 2008/0198798 A1* | 8/2008 | Wu | H04W 16/02 |
| | | | 370/328 |
| 2009/0132804 A1 | 5/2009 | Paul et al. | |
| 2009/0254552 A1* | 10/2009 | Vinberg | G06F 16/00 |
| 2009/0271786 A1 | 10/2009 | Groth | |
| 2010/0106988 A1* | 4/2010 | Hayashi | H05K 7/20836 |
| | | | 713/320 |
| 2010/0115303 A1 | 5/2010 | Stedman et al. | |
| 2010/0250746 A1* | 9/2010 | Murase | G06F 11/3433 |
| | | | 711/E12.001 |
| 2011/0173303 A1 | 7/2011 | Rider | |
| 2011/0178790 A1* | 7/2011 | Golbourn | G06F 11/1088 |
| | | | 703/22 |
| 2011/0289205 A1 | 11/2011 | Hansson et al. | |
| 2012/0159506 A1* | 6/2012 | Barham | G06F 9/5044 |
| | | | 718/104 |
| 2013/0086269 A1* | 4/2013 | Bairavasundaram | |
| | | | H04L 41/5009 |
| | | | 709/226 |
| 2013/0097601 A1 | 4/2013 | Podvratnik et al. | |
| 2013/0318297 A1* | 11/2013 | Jibbe | G06F 11/2005 |
| | | | 711/E12.001 |
| 2014/0068056 A1* | 3/2014 | Simitsis | G06F 9/5072 |
| | | | 709/224 |
| 2015/0026427 A1* | 1/2015 | Toda | G06F 3/0607 |
| | | | 711/165 |
| 2015/0278041 A1 | 10/2015 | Ganesan et al. | |
| 2015/0309825 A1 | 10/2015 | Farkas et al. | |
| 2015/0355982 A1 | 12/2015 | Ganesan et al. | |
| 2015/0371354 A1 | 12/2015 | Petersen et al. | |
| 2016/0077859 A1 | 3/2016 | Cropper | |
| 2016/0092323 A1* | 3/2016 | Moscovici | G06F 11/0709 |
| | | | 714/4.12 |
| 2016/0092535 A1* | 3/2016 | Kuchibhotla | G06F 3/04842 |
| | | | 707/634 |
| 2016/0338136 A1* | 11/2016 | Zhang | H04W 76/19 |
| 2017/0031602 A1 | 2/2017 | Xu et al. | |
| 2017/0034064 A1* | 2/2017 | Everhart | G06F 9/5011 |
| 2018/0246751 A1 | 8/2018 | Dong et al. | |
| 2018/0359150 A1 | 12/2018 | Perfect et al. | |
| 2020/0042355 A1 | 2/2020 | Krishnan et al. | |

OTHER PUBLICATIONS

Notice of Allowance received for U.S. Appl. No. 16/443,943, dated Jun. 15, 2021, 17 pages.

\* cited by examiner

METHOD FOR REPOINTING RESOURCES BETWEEN HOSTS

RELATED APPLICATIONS

This application is continuation of U.S. patent application Ser. No. 16/443,943, entitled "METHOD FOR REPOINTING RESOURCES BETWEEN HOSTS", filed Jun. 18, 2019, which claims benefit under 35 U.S.C. 119(a)-(d) to Foreign Application Serial No. 201841028748, filed in India, entitled "METHOD FOR REPOINTING RESOURCES BETWEEN HOSTS", filed on Jul. 31, 2018, which are herein incorporated by reference in their entirety for all purposes.

FIELD

The present disclosure relates generally to cloud computing, and more specifically to managing host device resources within data centers that provide a cloud computing environment.

BACKGROUND

Cloud computing is an area of technology that has seen a lot of growth. Under a conventional computing approach, end-users run software applications on their personal computers and/or access software services hosted by local servers (such as servers run by a business enterprise). In contrast, in a cloud computing paradigm, the traditional hardware resources (e.g., computational and storage) are "in the cloud," meaning they are physically hosted at a remote facility that is accessed via a computer network, such as the Internet. Computational (e.g., compute) and storage resources hosted by a cloud operator can be accessed via "services," which are commonly referred to as cloud-based services, Web services or simply services.

Cloud-based services are typically hosted by a datacenter that includes the physical arrangement of host devices (e.g., nodes, servers, clusters) that make up a cloud or a portion of a cloud. Each host device commonly includes various physical resources including, but not limited to, a compute, network, and shared storage resources to support scaling workload requirements.

In some instances, a need arises to remove one of the host device in a cluster of host devices. Examples of events which can necessitate removal of a host device from a cluster of hosts include but are not limited to a loss of network connection, power failure, software bug, or any other event that causes a host device (e.g., a disk, server, node computer, etc.) to fail. In such scenarios, to ensure that the cloud-based service remains operational and to minimize the downtime for the Web services, various host removal techniques are currently available. However, such techniques are often time and resource intensive and/or require migration (e.g., evacuation) before the host device can be removed from the host cluster.

In some instances, after a failure of the host device's resource, data from the storage resource must be migrated (e.g., evacuated) to a different storage resource on another host device so that the data and/or a service associated with the data remains available for the Web based service. However, when the host device includes high capacity drives, a significant amount of time is necessary to copy the data from the failing host device's drives to other drives in non-failing host devices. As a result, the Web services can encounter unwanted interruptions and outages due to the time necessary to get the storage resource (and the host) back in operation.

SUMMARY

Techniques described herein use a virtual identifier to provide a level of abstraction for a host device's resources. The virtual identifier provides a link between the host device and the physical resource. As a result, each physical resource is connected to a respective host device via the resource's virtual identifier.

If, during operation, it becomes necessary to remove (e.g., disable) a host device from the host cluster, instead of migrating the resources using the traditional time-intensive techniques, the present system allows for the reallocation (e.g., repointing) of the resource's virtual identifier from the host device, which is being removed, to a newly selected host device. In the case of a storage resource, the data in the storage resource is migrated to a new host device by reallocating the storage device's virtual identifier to the new host device instead of copying the data from the removed host device to another host device. Reallocating a resource's virtual identifier from a failing host device to another non-failing host device, minimizes the overhead required to migrate (e.g., evacuate) a resource from the host device.

DETAILED DESCRIPTION

Certain details are set forth below to provide a sufficient understanding of various embodiments of the present technique. However, it will be clear to one skilled in the art that embodiments of the technique can be practiced without one or more of these particular details. Moreover, the embodiments of the present techniques described herein are provided by way of example and should not be used to limit the scope of the techniques to these particular embodiments. In other instances, hardware components, network architectures, and/or software operations have not been shown in detail to avoid unnecessarily obscuring the technique.

Figure 1:
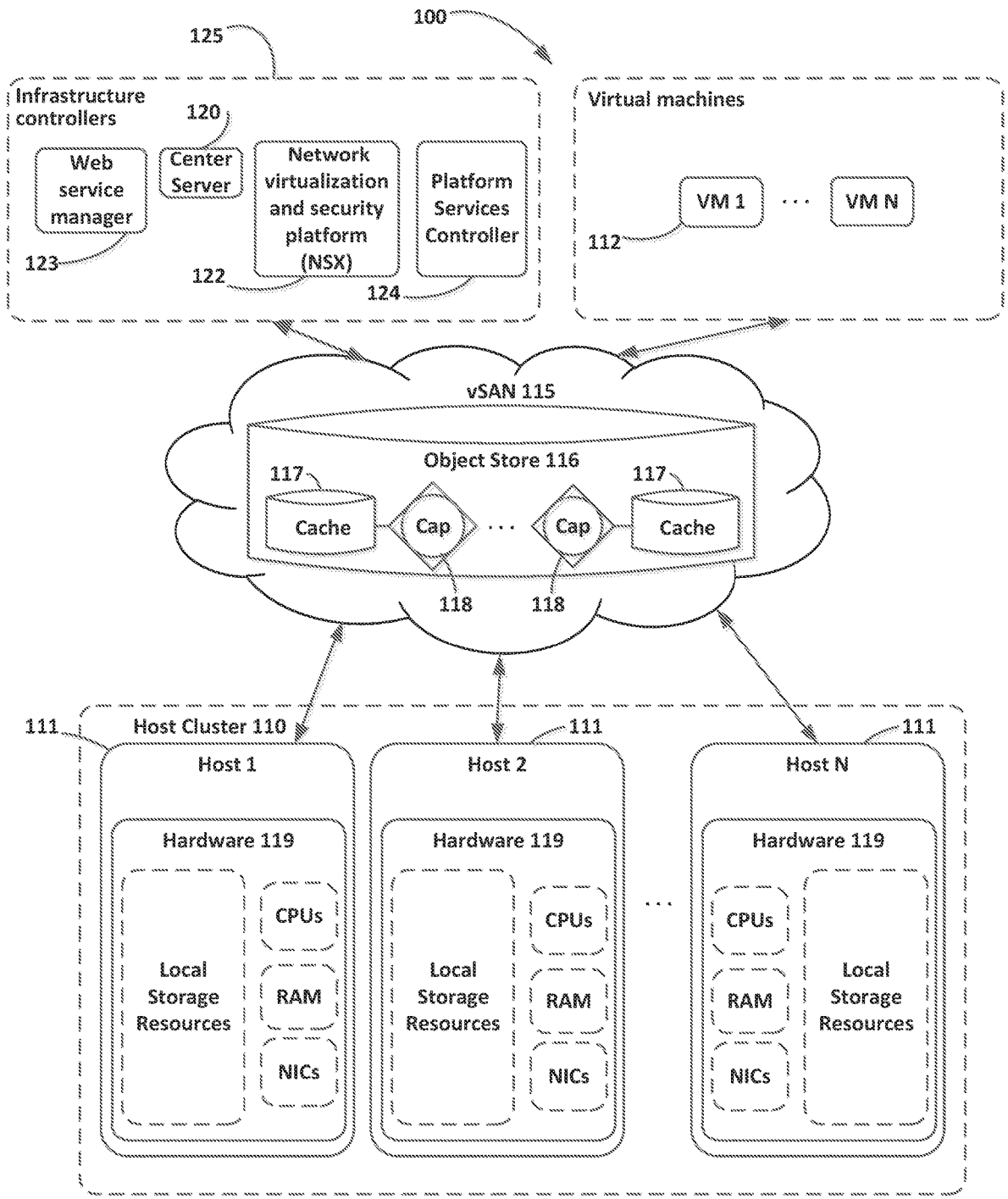
FIG. 1 illustrates a block diagram of an exemplary computing environment, according to some embodiments.

FIG. 1 illustrates a block diagram of a computing environment 100, according to some embodiments. As shown, computing environment 100 includes software-based "virtual storage area network" (vSAN) environment that leverages the commodity local storage housed in or directly attached (hereinafter, use of the term "housed" or "housed in" can be used to encompass both housed in or otherwise directly attached) to one or more of host devices 111 (e.g., server, nodes). The host devices 111 are part of a cluster 110 to provide an aggregate object store 116 to virtual machines (VMs) 112, and infrastructure controllers 125 including the center server 120, the network virtualization and security platform 122 (NSX), Web service manager 123, and the platform services controller 124. Both the infrastructure controllers 125 and the virtual machines use the vSAN for operation and for interaction with the host devices 111. The infrastructure controllers 125 are used to manage the host devices 111. The local storage housed in or otherwise directly attached to the host devices 111 can include combinations of cache tier drives 117 (e.g. solid-state drives (SSDs) or NVMe drives) and/or capacity tier drives 118 (e.g., SSDs or magnetic/spinning disks).

In some examples, the network virtualization and security platform 122 is associated with cluster 110 of host devices 111. The network virtualization and security platform 122 enables the Web service manager 123 or an administrator to manage VMs on the host devices 111. Managing VMs in this manner may include creating, removing, and/or otherwise modifying VMs.

As depicted in the embodiment of FIG. 1, each host device 111 includes hardware 119 (which includes the cache tier drives 117 and capacity tier drives 118 of a host device 111). Hardware 119 can further include memory, one or more processors, network interface, and various I/O devices. Memory includes random access memory (RAM), including but not limited to volatile RAM (e.g., DRAM, SRAM) and non-volatile RAM (e.g., NAND). Memory further includes computer-readable storage medium. The computer-readable storage medium is, for example, tangible and non-transitory. For example, memory includes high-speed random-access memory and also includes non-volatile memory, such as one or more magnetic disk storage devices, flash memory devices, or other non-volatile solid-state memory devices. In some embodiments, the computer-readable storage medium of memory stores instructions for performing the methods and processes described herein. In some embodiments, hardware 119 also includes other components, including power supplies, internal communications links and busses, peripheral devices, controllers, and many other components.

The network virtualization and security platform 122, in part, manages hardware 119 to properly allocate computing resources (e.g., processing(compute) power, random access memory, etc.) for each VM 112. The infrastructure controllers 125, including but not limited to the network virtualization and security platform 122, also provide access to a virtual storage area network (e.g., vSAN) 115. The virtual storage area network includes storage resources located in hardware 119 (e.g., cache tier drives 117 and capacity tier drives 118) for use as storage for virtual disks (or portions thereof) that can be accessed by any VM 112 residing in any of host devices 111 in cluster 110.

In some embodiments, various software platforms are installed on the host devices 111 to aid in managing the computing environment 100. For example, the installed software platforms help virtualize and aggregate the underlying physical hardware resources across multiple systems and provides pools of virtual resources to the datacenter. Some software platforms provide for software-defined storage (SDS) that pools together direct-attached storage devices across a cluster of hosts to create a distributed, shared data store. Furthermore, other software platforms offer a utility that eliminates the need for dedicated standby hardware and software in a virtualized environment. Additionally, some software platforms help to de-couple network functions from the physical devices in a way that is analogous to de-coupling virtual servers (VMs) from physical servers and thus, natively re-create the traditional network constructs in virtual space. Moreover, some software platforms provide a centralized platform for managing a virtual environment, allowing for automation and easy maintenance of a virtual infrastructure across a hybrid cloud. Such software platforms are made commercially available by VMware, Inc. (VMware) and include vSphere™, vMotion™, vSAN™, vSphere High Availability (vSphere HA), and VMware NSX™—along with vCenter Server™ which all, or a selection of, can be installed on host devices 111 to run on elastic, bare-metal infrastructure. In some embodiments, the host devices 111 use bare-metal infrastructure services provided by a data center provider, such as Amazon's AWS™ service.

Figure 2:
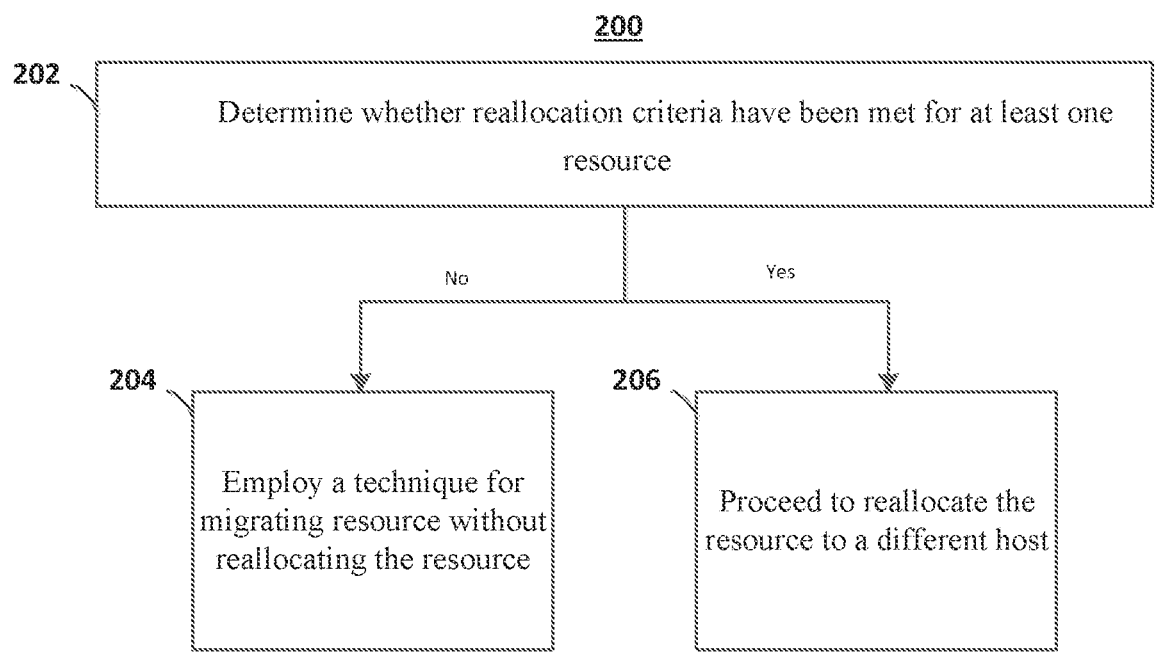
FIG. 2 depicts a flow diagram of an exemplary process, according to some embodiments.

As discussed above, in some embodiments it may become necessary to migrate (e.g., evacuate) a resource, or data on the resource, from the first host device to another host device. The need to migrate may, for instance, be due to the failure of the resource or host or a result of a system administrator manually requesting to migrate the resource. FIG. 2 depicts a flow diagram illustrating an exemplary process 200 for determining whether criteria have been met for reallocating a resource during a migration. Process 200 is performed at a computer system (e.g., 100) including a virtualized computing environment with virtualized components (e.g., virtual computing instances such as VMs 112, virtual disks, containers, etc.). Exemplary process 200 includes the criteria necessary to determine whether to reallocate a host device resource from one host device (e.g., 111) to another. Process 200 balances the need to reduce the time necessary to migrate a resource with the need to ensure that resource is within the necessary failures to tolerate (FTT) specification (e.g., ensuring that the data on the resource is not lost). Some operations in exemplary process 200 are, optionally, combined, the order of some operations is, optionally, changed, and some operations are, optionally, omitted. Additional operations are optionally added.

At block 202, the computer system (e.g., Web service manager 123) determines whether reallocation criteria have been met for at least one resource. In some embodiments, when the resource being migrated is a storage resource, the criteria may include the number of copies of the particular storage available. For example, if the number of copies for the particular storage is less than a predetermined threshold of copies (e.g., zero, one, two) as per the FTT requirements, the computer system, at block 204, will forgo reallocating the resource and will employ a different technique to migrate the data. A different technique, for example, may include replicating (e.g., copying) the data from the resource on the first host device to a different location distinct from the first host device and then, once again, copying the data from the different location to a second host device. As a result of the replication, the FTT requirements are maintained and the data will not be lost. However, replicating the data may in some instances slow down the migration process as compared to the reallocation technique, as described below.

In some embodiments, determining the criteria for whether to reallocate a resource has been met includes determining, by the computer system (e.g., vCenter from VMWare), the time necessary to replicate the data on the storage resource. In some examples, this determination is an estimation and is based, at least, on the amount of resource data being replicated and/or the network bandwidth. In some embodiments, the computer system determines whether to reallocate a resource by comparing the time necessary to replicate the resource with the time necessary to reallocate the resource. For example, if the time required to replicate the resource is greater than the time required to reallocate the resource, the computer system may, optionally, decide to reallocate the resource as opposed to replicating the data resource. The time necessary to reallocate the resource could be, for example, a predetermined static value, past measured reallocation times, or a combination of both. In some embodiments, the replication time and reallocation time can influence various quality metrics of the cluster of hosts. In some embodiments, the computer system determines whether to reallocate a resource based on a system configuration setting such that the configuration setting may, optionally, provide an override to always choose to either reallocate the resource or use a different technique to migrate the resource.

In some embodiments, the criteria for whether to reallocate the resource depends on the type of the resource. For example, when the resource to be migrated is not a storage resource (e.g., one or more processors (e.g., compute), a memory, a network interface, a graphics processing unit (GPU), and a field-programmable gate array (FPGA)), reallocation may be the only possibility as it is may not be practical or possible to replicate a non-storage resource from the first host device to a different host device. As a result, reallocating a resource, as discussed below, will provide continued operation with minimal interruption to the end user.

In some embodiments, reallocating non-storage resources may, optionally, incur an interruption of the software running in the VM. To mitigate the interruption, the computer system may, optionally, provide a graphical user interface (GUI) where a system administrator can provide configuration information for these VMs to instruct the computer system that the software running in the VM can tolerate this interruption. In some embodiments, the interruption includes suspending the VM to memory or powering-down the VM. In some embodiments, a software agent running (e.g., executing) inside the VM may, optionally, inspect the software running on the VM and based on a predetermined whitelist of software that can tolerate such interruptions automatically, provide an indication to the computer system that the VM can tolerate this interruption.

At block 206, when the computer system determines that the reallocation criteria have been met for at least one resource (e.g., the number of copies of the data on the resource is greater than a predetermined threshold, the resource is not a storage resource), the computer system will proceed to reallocate the resource to a different host, as discussed below.

Beyond the vSAN environment as described above, rackscale architectures have been developed where instead of having a host device with a particular amount of compute resource (CPU), network resource, storage resource; a pool of CPUs, and a pool of network interfaces, and a pool of storage resources are all connected by a high-speed backplane and a host device may be selected from these pools. In some embodiments of the present invention, in instances of planned downtime (e.g., outage), by using a technique called live migration (e.g., vMotion from VMWare), a VM on one host (e.g., a set of CPU and memory) can be reallocated to another host device (e.g., a set of CPU and memory) with virtually no downtime to the VM. Unlike the traditional rackscale architectures, the present implementation may, optionally, include disaggregated memory to improve performance. Unlike traditional rackscale architectures, in some embodiments, moving a VM from one set of CPUs to another set of CPUs, saves considerable amount of time by not requiring writing the state of the VM to the common storage device and then restarting the VM on the other set of CPUs. Consequently, the disclosed embodiments minimize the disruptions to the users of the virtual infrastructure.

Moreover, certain software deployments have been developed with shared storage (e.g., vSphere from VMWare) resource, wherein the same storage array is accessible from multiple hosts. In some embodiments of the present invention, there is a high speed interconnect such that the storage resource has performance properties equivalent to direct attached storage resource.

Figure 3:
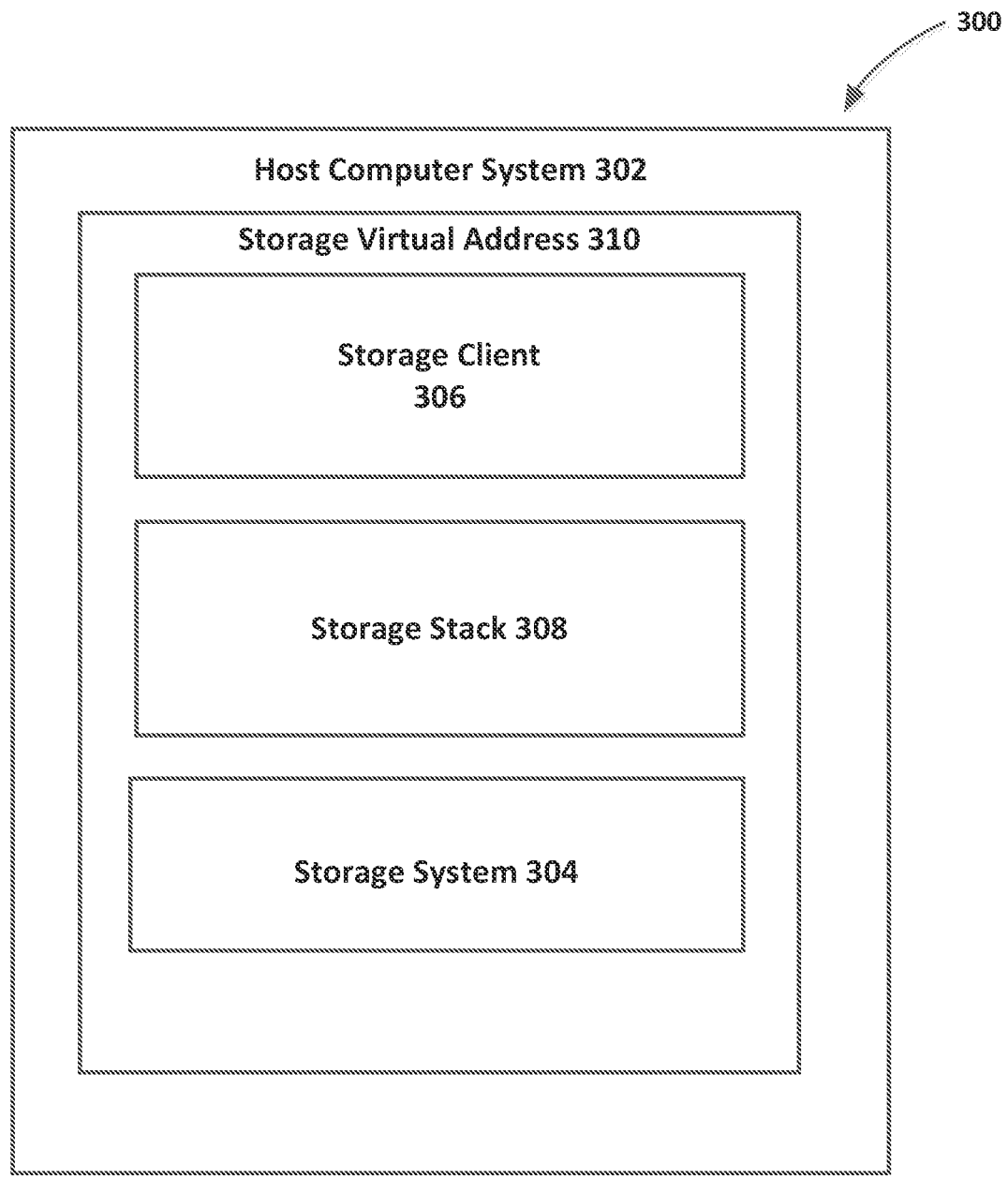
FIG. 3 illustrates a block diagram of an exemplary computing environment, according to some embodiments.

FIG. 3 is a simplified block diagram of an exemplary system (e.g., host) environment 300 in which embodiments of the reallocation techniques described herein can be implemented. As shown, host environment 300 includes a computer system 302 that is, optionally, communicatively coupled with a storage system 304. Computer system 202 comprises one or more storage clients (e.g., operating systems, hypervisors, applications, virtual machines (VMs), etc.) 306 and a storage stack 308. Storage stack 308 provides communication for storage client(s) 306 such that storage client(s) 306 is enabled to read data from, and write data to, logical storage objects (e.g., files) physical storage device(s) of storage system 304.

In FIG. 3, the storage client 306, storage stack 308, and the storage system 304 are all associated (e.g., in connection) with in a virtual identifier 310 (e.g., virtual network identifier). The virtual identifier 310 allows for the abstraction of hardware resources on the computer system 302 (e.g., host system). In some examples, the virtual identifier is a unique identifier for a particular resource. Examples of virtual identifiers include a network identifier, such as a Internet Protocol (IP) address or a media access control (MAC) address, a resource specific serial numbers, and other resource specific unique identifiers. Thus, even though the storage client, storage stack, and the storage system are all physically connected to the computer system 302, the computer system 302 maintains a layer of abstraction from the physical resources via the virtual identifier. As a result, as will be described in further detail below, in some embodiments, resources (e.g., physical resources) are able to be reallocated (e.g., repointed) between host devices.

FIGS. 1 and 3 are illustrative and not intended to limit embodiments of the present disclosure. For example, although a storage system 304 is shown as a standalone component, in certain embodiments, other physical resources are also associated with a virtual identifier. For example, each component of a host device's hardware 119 can be associated with a separate virtual identifier. For instance, the one or more processors (e.g., compute), the memory, the network interface, the graphics processing unit (GPU) are all physical components (e.g., resources), which can be associated with a virtual identifier and can be repointed as necessary to different host devices. Further, the various entities shown in these figures can include subcomponents or implement functions that are not specifically described. One of ordinary skill in the art will recognize many variations, modifications, and alternatives.

FIGS. 4A-4D depict exemplary processes for reallocating physical resources from one host device to a different host device.

Figure 4A:
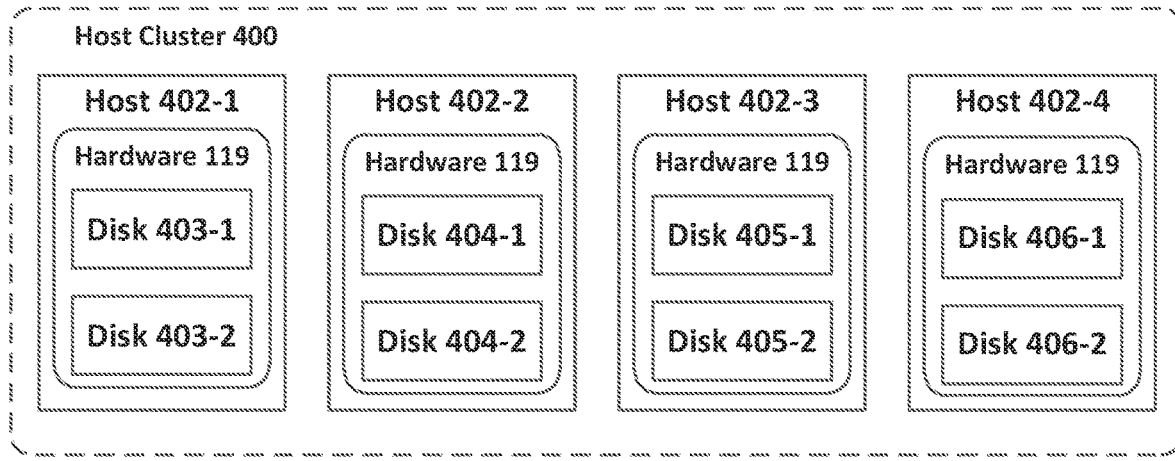
FIGS. 4A-4D illustrate an exemplary host cluster, according to some embodiments.

FIG. 4A depicts a host cluster 400, which includes four host devices 402-1-402-4. As illustrated, each of the host devices includes two physical disks (e.g., resources), though it will be appreciated that each host device may include any number of physical disks. For example, host device 402-1 includes disk 403-1 and 403-2. Host device 402-2 incudes physical disks (e.g., resources) 404-1 and 404-2. Host device 402-3 includes physical disks 405-1 and 405-2. Host device 403-4 includes disks 406-1 and 406-2. In some embodiments, each of the physical disks is assigned a virtual identifier (e.g., virtual network identifier(address)). The virtual identifier is, for instance, used to associate the physical disk with the respective host device.

Figure 4B:
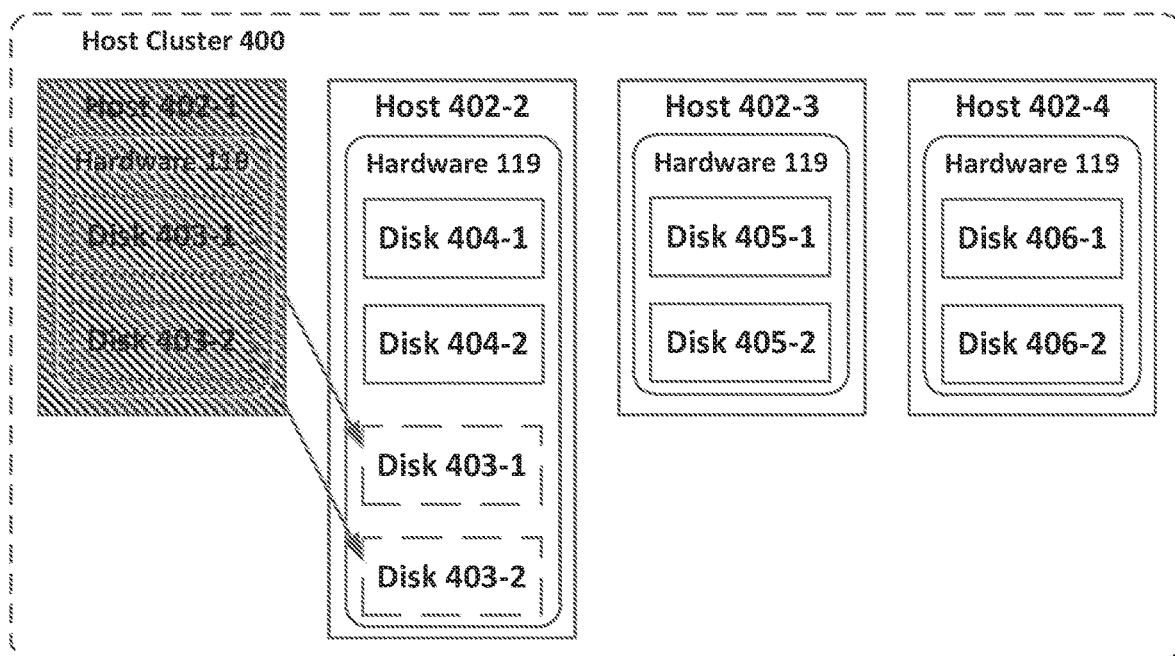

With reference to FIG. 4B, in operation, the Web service manager 123 (e.g., vSphere HA™) detects (e.g., receives) an event to disable the host device 402-1 and remove the host device 402-1 from the host cluster 400. In some examples, the Web service manager 123 uses a specialized module (e.g., software) to monitor hosts in the host cluster and in the event of a host failure, the module executes various failure remediation techniques to minimize the host downtime. An example of the described specialized module is vSphere High Availability (vSphere HA) as made commercially available by VMWare. In some embodiments, the event to disable the host device is automatically triggered and detected in response to the system detecting that one of the physical resources of the host device is failing. In another embodiment, the event is detected when the Web service manager 123 receives request to transition the host device to a maintenance mode.

In some embodiments, when the Web service manager 123 detects (e.g., receives) a disabling event, the Web service manager 123 determines (e.g., identifies) available resources at the host device 402-1. For example, the Web service manager 123 can determine that a storage system (e.g., 304), a computational resource (e.g., compute, processor), a memory (e.g., RAM, ROM), a network component, a field-programmable gate array (FPGA), and/or a graphics processing unit (GPU) are all resources at the host device capable of being reallocated (e.g., repointed) to a different host. In some embodiments, a subset of the identified resources may be capable of being reallocated to a different host. For example, one of the identified resources may have failed and, as a result, not be available for reallocation. In another example, one of the identified resources may not be configured to operate in accordance with a virtual network identifier.

Once the available resources have been identified, the Web service manager 123 determines whether the available physical resources are available to be reallocated (repointed) to different host devices. In some embodiments, the Web service manager 123 can automatically select certain physical resources for reallocation based on a predetermined criterion and/or without any user input. For example, the criteria can include the state of the physical resource (e.g., is the resource operational or failing, the time required to reallocate the resource, the total disruption to services relying on the identified resources, or any combination thereof. In some embodiments, the system can confirm reallocation with the system administrator prior to reallocating the resource. In some embodiments, reallocation is manually implemented. By way of example, the system can provide (e.g., output) an indication (e.g., a graphical representation on an administrator's display) which allows for the system administrator to select which resource(s) to reallocate to a different host device.

FIG. 4B further illustrates the reallocation of the selected (identified) available resources (e.g., the two physical disks) from a first host device to a second host device. For example, once the Web service manager 123 determines that the two disks 403-1 and 403-2 are capable of being reallocated, the Web service manager 123 reallocates (e.g., repoints) the virtual identifier associated with disks 403-1 and 402-1 from host device 402-1 to 402-2. Once all the identified physical resources have been reallocated from host device 402-1, the host device 402-1 can be disabled (e.g., removed from the host cluster). In some embodiments, once the host device 402-1 is disabled, the host device may be repaired, upgraded, and/or otherwise modified, as necessary, while allowing access to the reallocated resources via the reallocation process described herein. Moreover, once any modifications to the host device 402-1 have been made, host device 402-1 can be reintroduced (e.g., injected) to the host cluster 400 and, optionally, the reallocated resources (e.g., disks 403-1 and 403-2) can be reallocated back to host device 402-1.

Figure 4C:
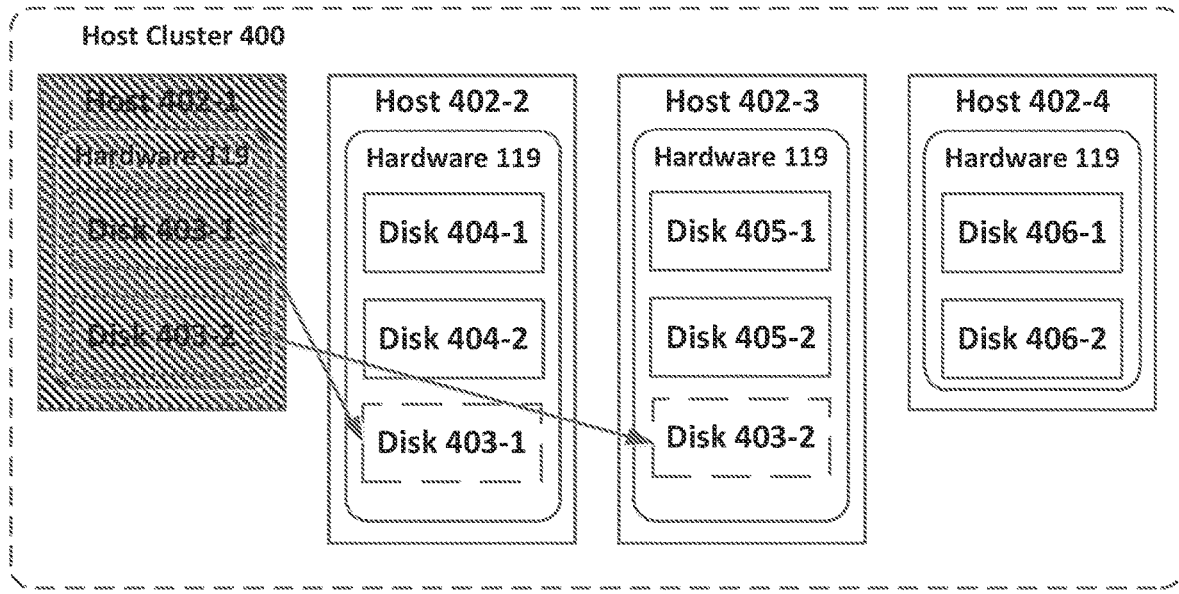

As illustrated in FIG. 4C, in some embodiments, the Web service manager 123 determines that identified resources (e.g., disks 403-1 and 403-2) cannot be reallocated to a single host. In such a scenario, the Web service manager 123 identifies several host devices, and reallocates the identified resources to the identified host devices. By way of example, the Web service manager 123 may identify host devices 402-2 and 402-3 as being available to receive portions of the identified resources, respectively. Accordingly, the Web service manager 123 reallocates the identified resources (e.g., disks 403-1 and 403-2) to host devices 402-2 and 402-3. As an example, the Web service manager 123 reallocates disk 403-1 to host device 402-2 and disk 403-2 to host device 402-3, as shown.

Figure 4D:
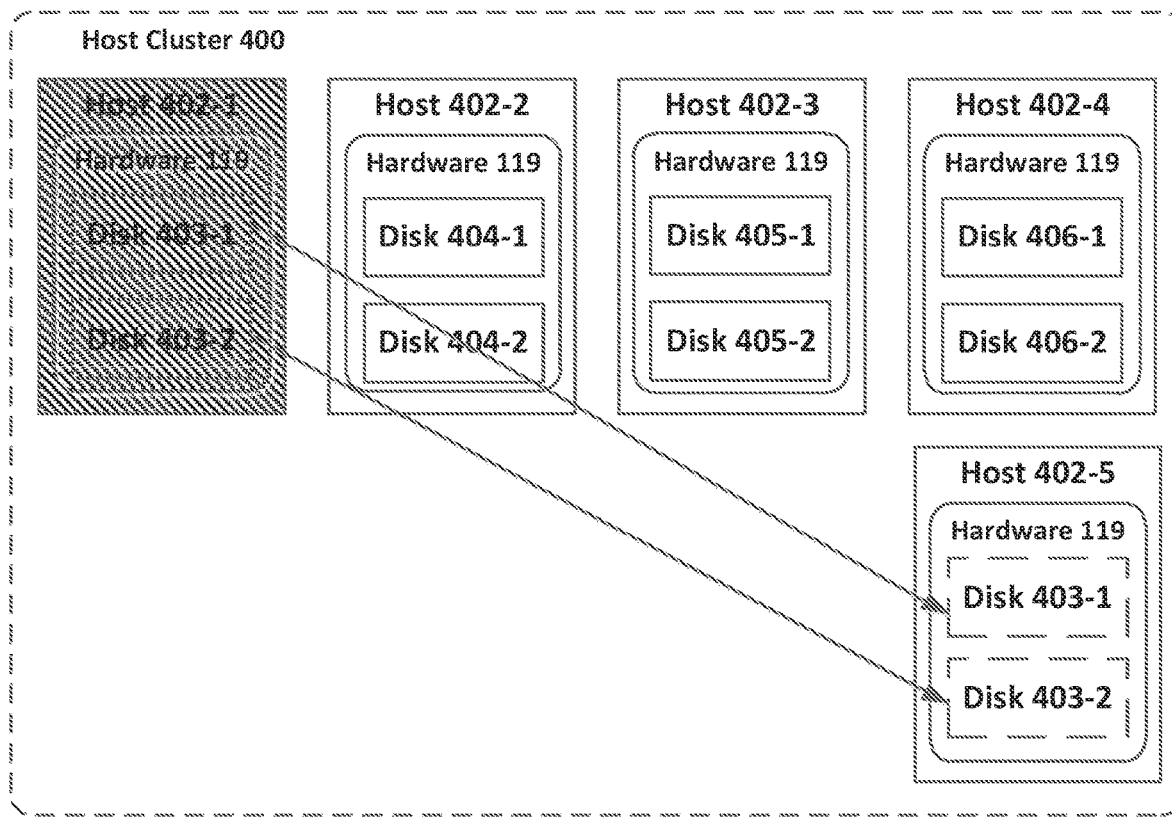

As illustrated in FIG. 4D, in some embodiments, the Web service manager 123 can determine that there are no host devices available for reallocation of resources (e.g., disks 403-1 and 403-2). In such a scenario, the Web service manager 123 can add (e.g., inject) a new host device, such as host device 402-5, to the host cluster 400. Once the new host device 402-5 has been added, the Web service manager 123 reallocates identified resources (e.g., disk 403-1 and 403-2) to the newly added host device 402-5.

Figure 5:
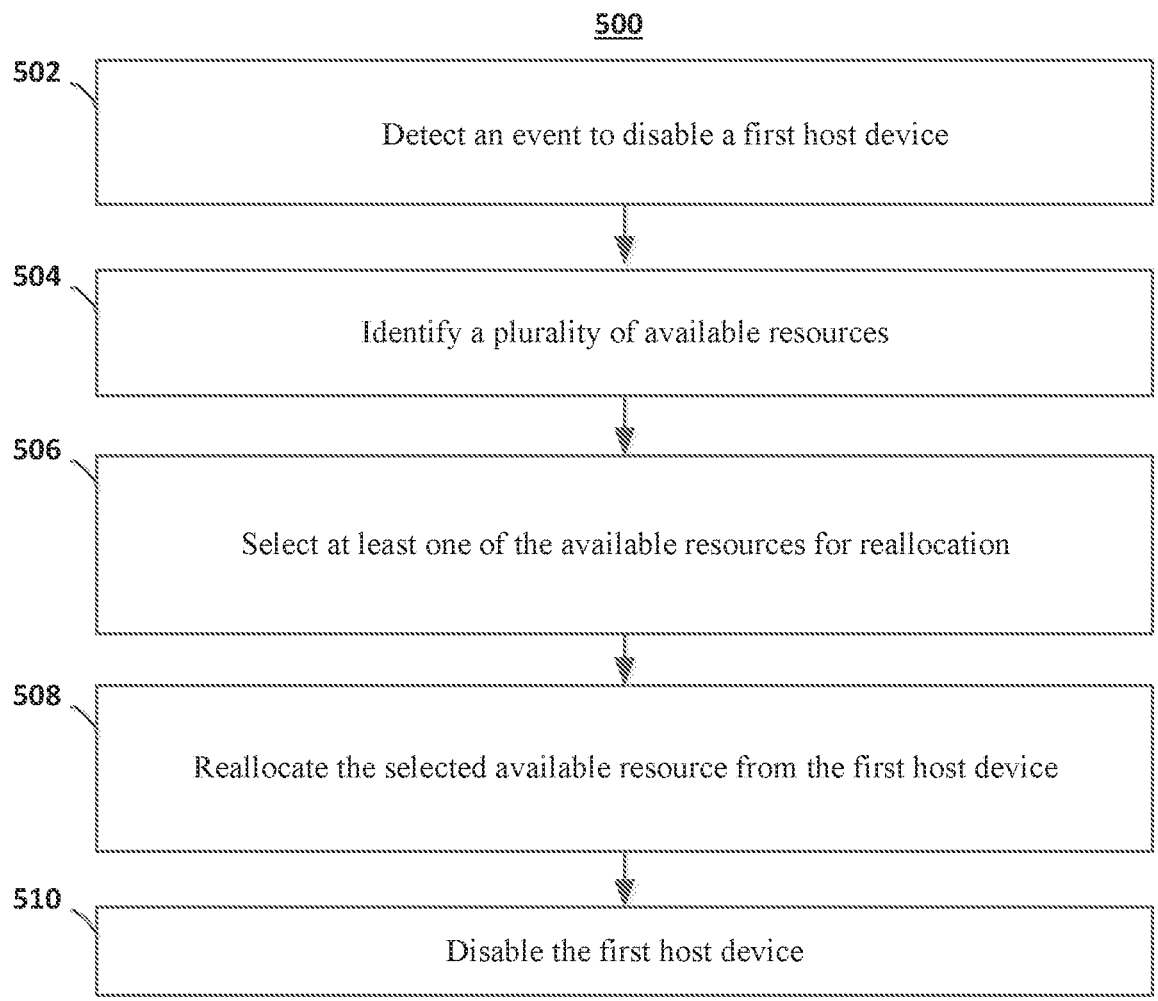
FIG. 5 depicts a flow diagram of an exemplary process, according to some embodiments.

FIG. 5 depicts a flow diagram illustrating an exemplary process 500 for reallocating a resource from a host device when the Web service manager 123 determines that the host device is being disabled, according to some embodiments. Process 500 is performed at a computer system (e.g., 100 or 300) including a virtualized computing environment with virtualized components (e.g., virtual computing instances such as VMs 112, virtual disks, containers, etc.). In some embodiments, exemplary process 500 could be used to implement the process of block 206. Exemplary process 500 provides an efficient technique for reallocating a host device resource from one host device (e.g., 111) to another. The process reduces the time necessary to migrate (e.g., evacuate) a resource and disable a host device. Some operations in exemplary process 500 are, optionally, combined, the order of some operations is, optionally, changed, and some operations are, optionally, omitted. Additional operations are optionally added.

At block 502, the computer system (e.g., Web service manager 123) detects an event to disable a first host device which is selected from a plurality of host devices. In some embodiments, computer system displays a visual representation (e.g., graphical user interface) of the plurality of host devices. A system administrator can use the visual representation to select the first host device to disable from the visual representation of the plurality of host devices. In some embodiments, the administrator selecting a host device can be interpreted by the computing system as an event to disable to the first host.

In some embodiments, an event to disable a first host device includes detecting a failure at the first host device. Examples of a failure at the first host device includes a loss of network connection, power failure, software bug, or anything that makes a host device (e.g., a disk, server, node computer, etc.) stop working. In such examples, the system would detect the failure and would send an instruction to disable the failing host device.

In some embodiments, an event to disable a first host device includes detecting an instruction to transition the first host device into a maintenance mode. VMs that are running on the host device entering maintenance mode need to be migrated to another host device (either manually or automatically) or shut down. In some examples, the host device is in a state of entering maintenance mode until all running virtual machines are powered down or migrated to different host devices. However, by introducing a layer of abstraction around the host device's resource and reallocating a resource's virtual identifier to a new host device, as described herein, the first host device can enter a maintenance mode without requiring that VMs running on the first host device be moved (e.g., copied) to another host device. Thus, the present technique allows for the migration (e.g., evacuation) of the resource by reallocating the resource's virtual identifier.

At block 504, after detecting a disabling event at block 502, the computer system identifies a plurality of available resources at the first host device. The identified resources include physical computer resources and can include memory, storage media, processors, GPUs, and other hardware components. In some embodiments, at least one or more of the identified resources are capable of being reallocated (e.g., repointed) to a different host device. In some embodiments, all of the identified resources are capable of being reallocated to a different host device.

As discussed above at block 200, in some embodiments, the system determines whether reallocation criteria have been met for reallocation of at least one of the available resources at the first host device. If at least one of the criteria has been met, the system proceeds to reallocate the resource as described below. If at least one of the criteria has not been met, the system forgoes reallocating the resource, and proceeds to migrate the resource using a different technique (e.g., replicating (e.g., copying) the data from a storage resource to a different location distinct/different from the first host device).

At block 506, after identifying a plurality of available resources at block 504, the computer system selects at least one of the available resources for which at least one of the reallocation criteria have been met at the first host device for reallocation to a second host device. In some embodiments, the system automatically selects the at least one available resources for which at least one reallocation criteria have been met at the first host device for reallocation to a second host device based on a predetermined criterion. For example, the predetermined criteria can include the state of a physical resource (e.g., is it operational, failing), the time necessary to reallocate the resource, the total disruption to the Web service. In some embodiments, the system can confirm the reallocation with the system administrator prior to reallocating the resource. In some embodiments, the Web service's system administrator uses a visual representation (e.g., graphical user interface) of a plurality of the host device's resources to select a specific resource for reallocation. The system identifies the selected resource as the resource for reallocation to a second host device.

At block 508, after selecting an available resource for reallocation at block 406, the computer system reallocates the selected available resource from the first host device to the second host device. In some embodiments, reallocating the selected available resource from the first host device to the second host device includes identifying a host device configured to employ (e.g., accept) the selected available resource. In some embodiments, the identified host is located in the same cluster as the first host device. Optionally, the second host device can be located in a different cluster than the first host device. After the computer system identified the host device configured to employ the selected available resource, the computer system disassociates the virtual identifier associated with the available resource from the first host device. Once the virtual identifier associated with the selected available resource from the first host device is disassociated from the first host device, the computer system associates the virtual identifier associated with the selected available resource with the identified host device. As a result, the selected available resource can continue operation on the identified host device. In other embodiments, a plurality of available resources can be reallocated in parallel or sequentially, as necessary.

At block 510, once all the selected available resources for which at least one of the reallocation criteria have been met have been reallocated at block 508, the computer system proceeds to disable to first host device. In some embodiments, the computer system proceeds to disable to first host device after reallocating only one resource.

In some embodiments, after the first host device is disabled, the computer system can further receive an instruction to enable the first host device selected from the plurality of host devices. In accordance with receiving an instruction to enable the first host device, the computer system will proceed to enable the first host device, identify a previously reallocated resource from the first host device to the second host device, and reallocate the previously reallocated resource from the second host device to the first host device by disassociating the reallocated resource's virtual identifier with the second host device and associating the reallocated resource's virtual identifier with the first host device.

In some embodiments, prior to disabling the first host device, the system can migrate the VMs stored on the first host to a third host device. For example, if the storage device is corrupt, it may not be possible to reallocate the storage device to a second host device even though it will be possible to reallocate the compute resource to a second host device. Thus, in some embodiments, the computer system identifies one or more virtual machines executing on the first host device and then copies the data associated with the identified one or more virtual machines from the first host device to a third host device selected from a plurality of host devices.

The above description illustrates various embodiments along with examples of how aspects of embodiments are implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   detecting an event to disable a first host device selected from a plurality of host devices;
   in response to detecting the event to disable the first host device:
      identifying a plurality of available resources at the first host device;
         determining that the time needed to replicate at least one of the available resources from the first host device to a second different host device is less than the time needed to reallocate the at least one of the available resources from the first host device to the second host device and a number of copies of the at least one of the available resources is less than a predetermined number of threshold copies; and replicating the at least one of the available resources from a first host device to the second host device in response to the determining.

2. The method of claim 1, further comprising:

receiving an instruction to enable the first host device selected from the plurality of host devices; and in accordance with receiving the instruction to enable the first host device:

enabling the first host device;

after enabling the first host device, identifying a previously reallocated resource from the first host device to the second host device; and reallocating the previously reallocated resource from the second host device to the first host device.

3. The method of claim 1, wherein detecting an event to disable a first host device selected from a plurality of host devices includes:

displaying a visual representation of the plurality of host devices; and receiving a selection of the first host device, wherein the first host device is selected from the visual representation of the plurality of host devices.

4. The method of claim 1, wherein detecting the event to disable a first host device includes detecting a failure of the first host device.

5. The method of claim 1, wherein disabling the first host device includes transitioning the first host device into a maintenance mode.

6. The method of claim 1, wherein the selected available resource is one or more storage media.

7. The method of claim 1, wherein prior to disabling the first host device, the method further comprising:

identifying one or more virtual machines executing on the first host device; and migrating the identified one or more virtual machines from the first host device to a third host device selected from a plurality of host devices, wherein the third host device is different than the first host device and different than the second host device.

8. A non-transitory computer-readable storage medium storing one or more programs configured to be executed by one or more processors of an electronic device for managing reallocation of resources between host devices, the one or more programs including instructions for:

detecting an event to disable a first host device selected from a plurality of host devices;

in response to detecting the event to disable the first host device:

identifying a plurality of available resources at the first host device;

determining that the time needed to replicate at least one of the available resources from the first host device to a second different host device is less than the time needed to reallocate the at least one of the available resources from the first host device to the second host device and a number of copies of the at least one of the available resources is less than a predetermined number of threshold copies; and replicating the at least one of the available resources from a first host device to the second host device in response to the determining.

9. The transitory computer-readable storage medium of claim 8, the one or more programs further including instructions for:

receiving an instruction to enable the first host device selected from the plurality of host devices; and in accordance with receiving the instruction to enable the first host device:

enabling the first host device;

after enabling the first host device, identifying a previously reallocated resource from the first host device to the second host device; and reallocating the previously reallocated resource from the second host device to the first host device.

10. The non-transitory computer-readable storage medium of claim 8, wherein detecting an event to disable a first host device selected from a plurality of host devices includes:

displaying a visual representation of the plurality of host devices; and receiving a selection of the first host device, wherein the first host device is selected from the visual representation of the plurality of host devices.

11. The non-transitory computer-readable storage medium of claim 8, wherein detecting the event to disable a first host device includes detecting a failure of the first host device.

12. The non-transitory computer-readable storage medium of claim 8, wherein disabling the first host device includes transitioning the first host device into a maintenance mode.

13. A computer system, comprising:

one or more processors; and memory storing one or more programs configured to be executed by the one or more processors for managing reallocation of resources between host devices, the one or more programs including instructions for:

detecting an event to disable a first host device selected from a plurality of host devices;

in response to detecting the event to disable the first host device:

identifying a plurality of available resources at the first host device;

determining that the time needed to replicate at least one of the available resources from the first host device to a second different host device is less than the time needed to reallocate the at least one of the available resources from the first host device to the second host device and a number of copies of the at least one of the available resources is less than a predetermined number of threshold copies; and replicating the at least one of the available resources from a first host device to the second host device in response to the determining.

14. The computer system of claim 13, the one or more programs further including instructions for:

receiving an instruction to enable the first host device selected from the plurality of host devices; and in accordance with receiving the instruction to enable the first host device:

enabling the first host device;

after enabling the first host device, identifying a previously reallocated resource from the first host device to the second host device; and reallocating the previously reallocated resource from the second host device to the first host device.

15. The computer system of claim 13, wherein detecting an event to disable a first host device selected from a plurality of host devices includes:
- displaying a visual representation of the plurality of host devices; and
- receiving a selection of the first host device, wherein the first host device is selected from the visual representation of the plurality of host devices.

16. The computer system of claim 13, wherein detecting the event to disable a first host device includes detecting a failure of the first host device.

17. The computer system of claim 13, wherein disabling the first host device includes transitioning the first host device into a maintenance mode.

\* \* \* \* \*